United States Patent [19]

Minor et al.

[11] Patent Number: 4,718,025

[45] Date of Patent: Jan. 5, 1988

[54] COMPUTER MANAGEMENT CONTROL SYSTEM

[75] Inventors: Paul S. Minor; Charles S. Matheny, both of Fairfax County, Va.

[73] Assignee: Centec Corporation, Reston, Va.

[21] Appl. No.: 723,496

[22] Filed: Apr. 15, 1985

[51] Int. Cl.⁴ .............................................. G01F 15/06
[52] U.S. Cl. ..................... 364/550; 364/518; 340/721
[58] Field of Search ........... 364/550, 518–522, 364/551; 340/715, 721, 722, 745, 286 M

[56] References Cited

U.S. PATENT DOCUMENTS

| | | | |
|---|---|---|---|
| 3,810,138 | 5/1974 | Thompson et al. | 340/715 |
| 4,176,395 | 11/1979 | Evelyn-Veere et al. | 364/420 |
| 4,244,022 | 1/1981 | Kendall | 364/420 |
| 4,276,610 | 6/1981 | Fleck | 364/900 |
| 4,463,380 | 7/1984 | Hooks, Jr. | 358/209 |
| 4,471,348 | 9/1984 | London et al. | 340/722 |
| 4,476,535 | 10/1984 | Loshing et al. | 364/550 |
| 4,542,472 | 9/1985 | Toms, II | 364/550 |
| 4,543,572 | 9/1985 | Tanaka et al. | 340/721 |
| 4,561,057 | 12/1984 | Haley, Jr. et al. | 364/550 |
| 4,568,072 | 2/1986 | Piotroski | 364/479 |
| 4,570,217 | 2/1986 | Allen et al. | 364/188 |
| 4,574,395 | 3/1986 | Kato | 364/518 |
| 4,575,803 | 3/1986 | Moore | 364/550 |
| 4,586,144 | 4/1986 | Fukumoto | 364/550 |
| 4,586,147 | 4/1986 | Tadokoro | 364/550 |
| 4,588,987 | 5/1986 | Stephens | 340/286 M |
| 4,601,021 | 7/1986 | Paul et al. | 340/721 |
| 4,628,470 | 12/1986 | Baumann | 364/518 |
| 4,639,881 | 1/1987 | Zingher | 364/521 |

FOREIGN PATENT DOCUMENTS 59-063519  4/1984  Japan ........................... 364/550

Primary Examiner—Errol A. Krass
Assistant Examiner—Brian M. Mattson
Attorney, Agent, or Firm—Dickstein, Shapiro & Morin

[57] ABSTRACT

A computer management manufacturing monitoring system for monitors the operation of a manufacturing process. The input section of the system is coupled to a plurality of sensors for monitoring the states of such sensors. A logging program periodically reads the states of various sensors and stores information relating to each such sensor state in a data base. The stored data includes both direct sensor readings and as derived sensor information calculated from readings of the states of certain sensors. The operation of the logging program is predicated on a logging model constructed by an operator. A database storage section stores the information received from the logging program relating to the reading of each sensor state read in a database format. A display generator causes information to be displayed from the database on a display screen. A control program controls the operation of the logging program for determining which of the sensors should be read, when such sensor should be read and whether the readings from each sensor read should be stored as a direct value or used for calculating a derived value that should be stored in the database.

30 Claims, 20 Drawing Figures

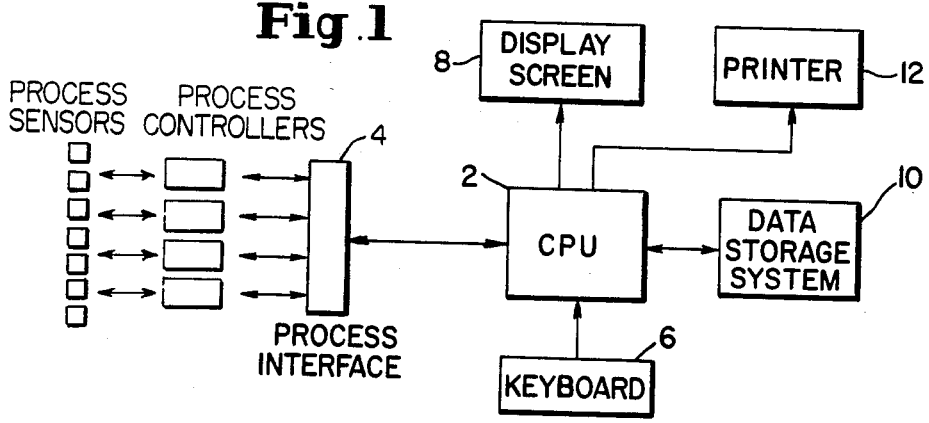
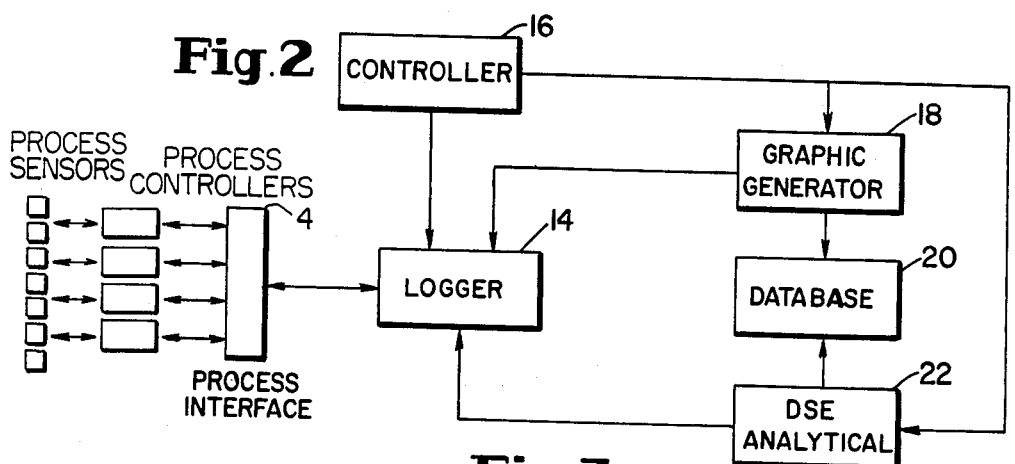
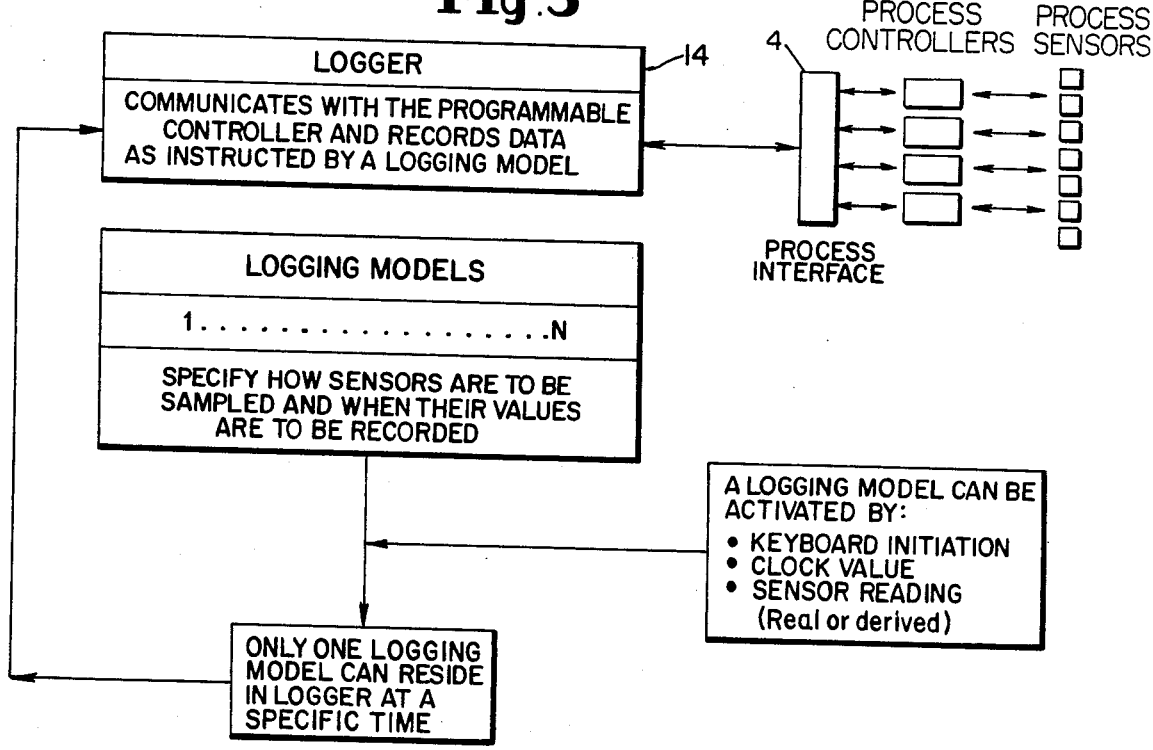

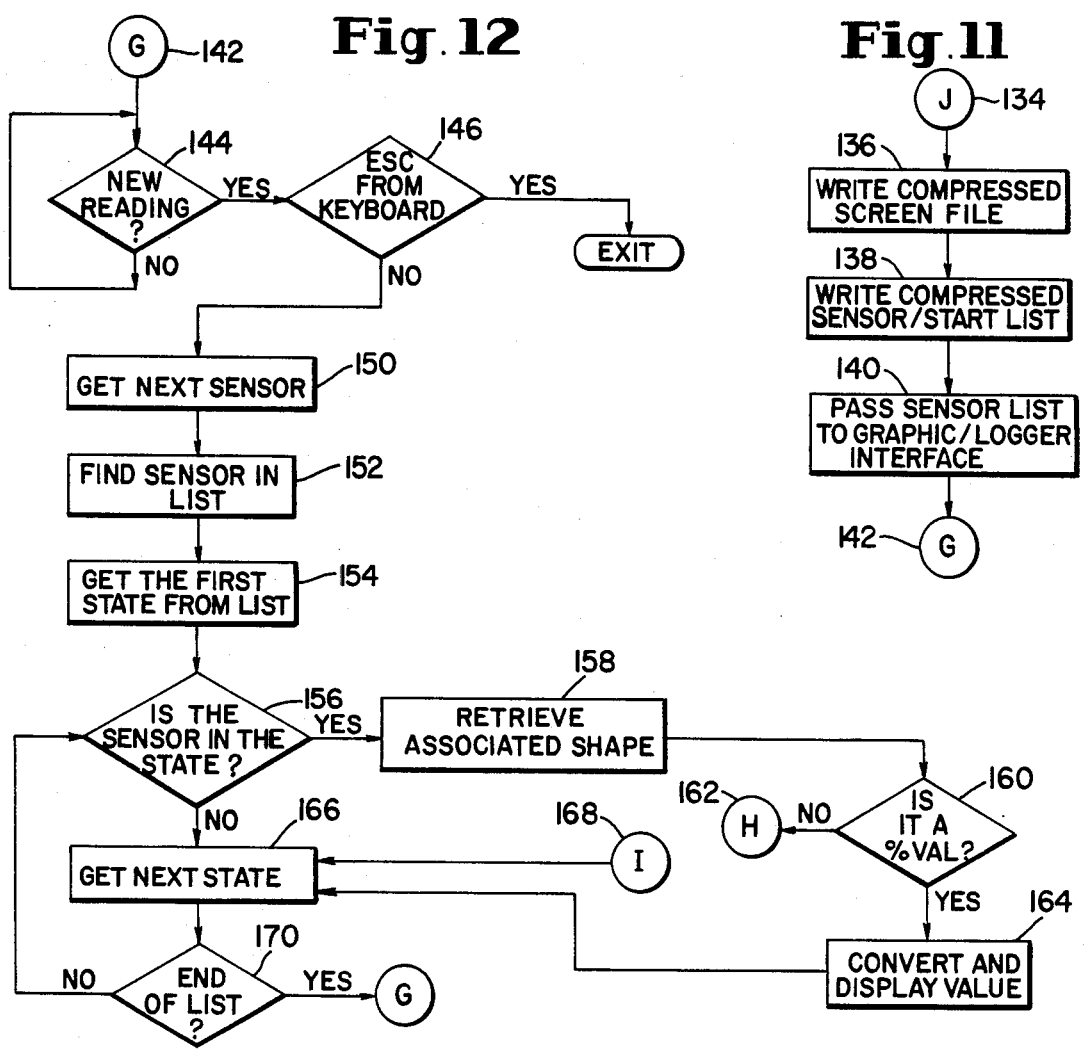
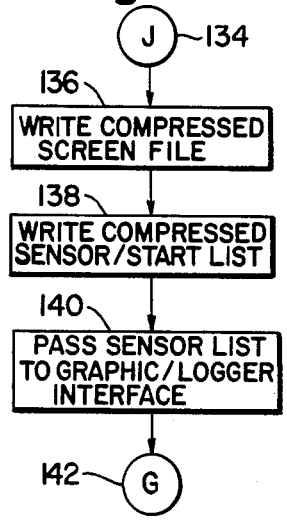
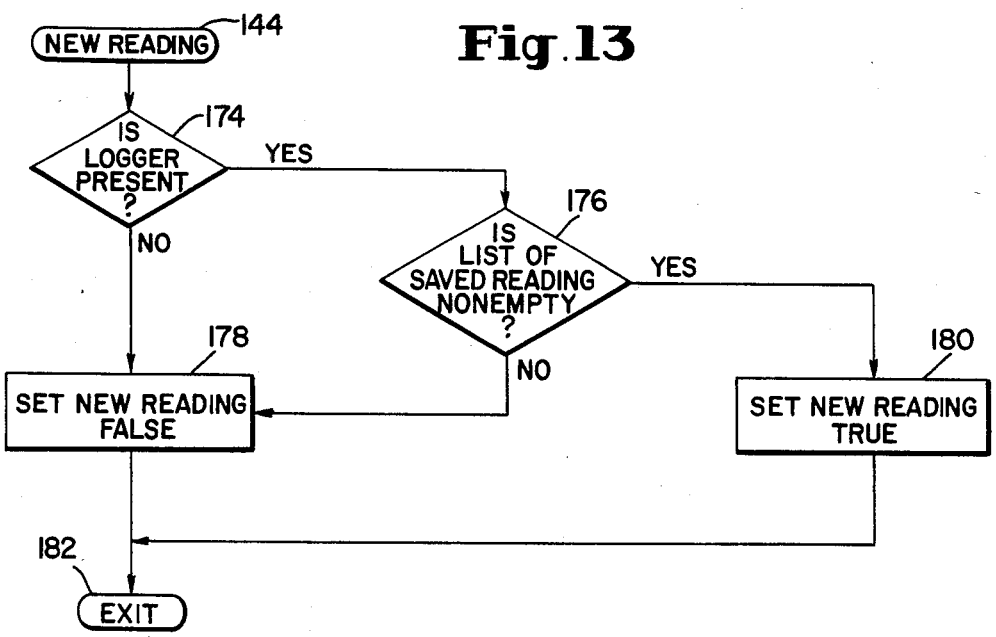

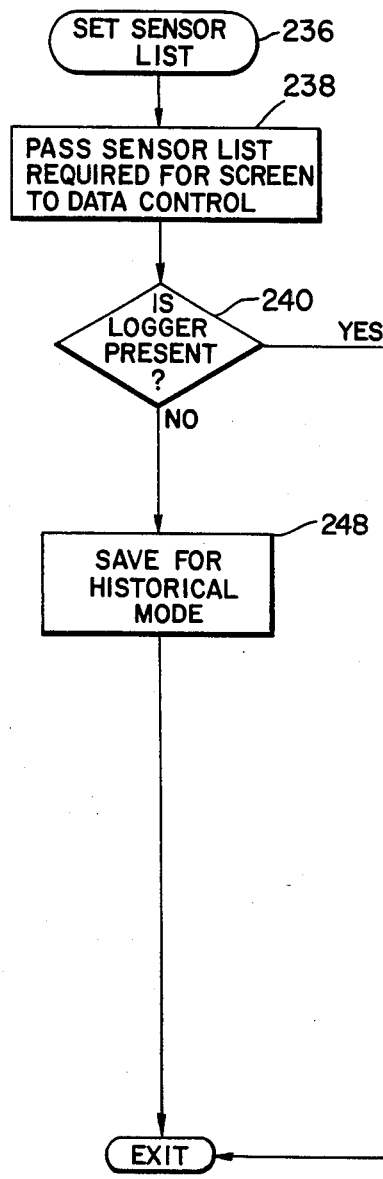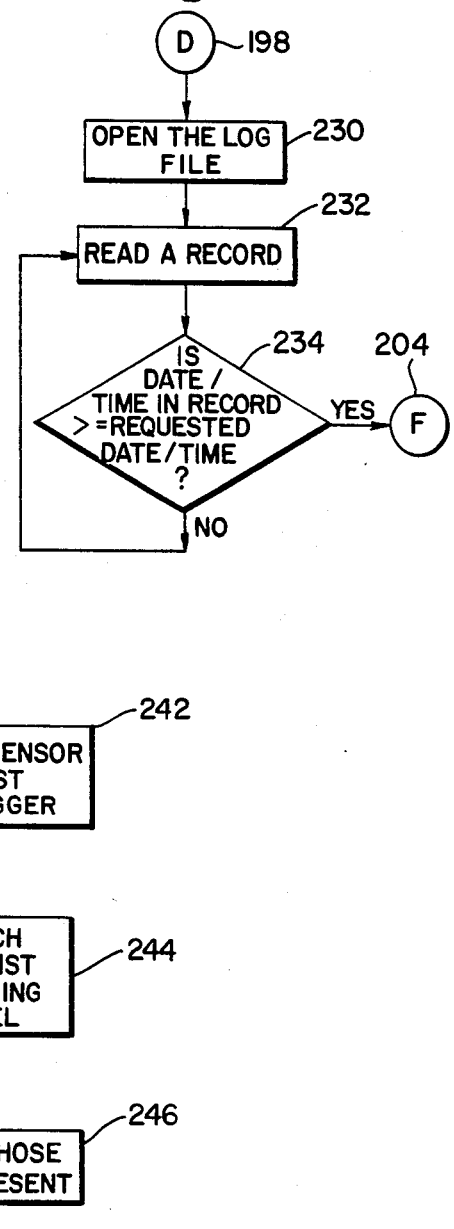

COMPUTER MANAGEMENT CONTROL SYSTEM

BACKGROUND OF THE INVENTION

The present invention involves a computer management system for monitoring and assisting in the operation of a manufacturing facility.

In monitoring process operations during the running of a manufacturing facility, it has been common to log the readings of all of the sensors at various stages of the process for keeping track of information regarding the operation of the manufacturing process. These sensors have traditionally all been logged at set time intervals or on a substantially continuous basis. Such information has been recorded either on a computer memory storage member, such as on a magnetic tape or in a hard disk drive, or in hard copy form through printers or a set of graphic plotters.

Such information then is subsequently analyzed by the operator by obtaining and reviewing the hard copy printout of all of the readings from all the sensors. This process has been both complex and burdensome to the operator and necessitates the use of an operator that is reasonably skilled in the operation of the manufacturing facility as well as in the analysis of the technical data and the operation of computers.

As a result, most engineers during the operation of the manufacturing facility will spend time extracting data from various strip charts, log sheets, and quality control reports. After the data is assembled, it is analyzed by the engineer either on a hand calculator or entered into a personal computer for processing on an electronic spread sheet. The data needs to be entered by hand which is a time consuming and inefficient task.

SUMMARY OF THE INVENTION

An object of the present invention is to provide a computer manufacturing management system to facilitate the ability of the operating staff of a manufacturing facility to monitor and control the manufacturing operation.

Another object of the present invention is to provide a monitoring system that provides better access to information that can be developed from various sensor readings from the manufacturing process.

A further object of the present invention is to provide a management control system that enables the operating staff to obtain detailed sensor readings from particular desired sensors during various stages of the operation of the process with the information provided to the operation staff including both direct sensor readings as well as derived sensor readings based upon calculations made from various sensor readings.

Still another object of the present invention is to provide a manufacturing management control system that automatically logs data from a production facility according to sampling and logging instructions entered into the computer by the production staff.

Still a further object of the present invention is to provide a manufacturing management control system that scans any portion of the industrial process within the manufacturing facility over any time period that is chosen by the production staff and to provide a graphic display of such information.

A still further object of the present invention is to provide a procedure for enabling information regarding the operation of a process in a manufacturing facility to be automatically logged according to various logging models constructed by the production staff and to display such information in either chart form or graphic form at the desire of the operation staff.

Still another object of the present invention is to provide a manufacturing management control system that enables the operator to issue set point changes and other control commands to the various process controllers within the manufacturing facility from the computer monitoring system either as individual commands or in sets of commands depending upon changes in operating conditions.

The computer manufacturing management system of the present invention provides for more efficient management of a manufacturing process. Data is collected from the various process controllers within the manufacturing plant with such data being collected based upon various logging models that are constructed within the computer system by the operator. The data that is collected is then stored within a database in a storage member, such as in a hard disk system. This data then can be analyzed by the computer control system utilizing a direct sensor entry analytical model built within the system or can be viewed using a graphic display on a display screen in which the information from various sensors is tied to various shapes of the graphic display.

The computer manufacturing management system of the present invention provides for numerous advantages over previously available systems and in particular for the following capabilities: automatically logging data from the production facility in background in accordance with sampling and logging instructions that are entered into the system by the production staff; scanning any portion of the industrial process over any time period, either present or historical, that is chosen by the production staff with the information being displayed in a graphic display containing a variety of different shapes and symbols to which the readings from various sensors can be tied; allowing the production staff to build various process models, inventory and production reports, and perform special analyses using an electronic spread sheet with direct sensor entry of the information from the sensors into the spread sheet or from the database storage of the sensor readings into the spread sheet; and the ability to issue set-point changes and other control commands to process controllers from the keyboard of the computer system either as individual control commands or as sets of commands for changing the process operation or upon the occurrence of certain conditions of operation.

In initiating the process of logging data from the various sensors, the computer manufacturing management system enables the operator to construct one or more desired logging models. A logging model specifies which sensors are to be sampled and when and under what conditions they are to be permanently logged. The logging criteria can be predicted on time, changes from previous values, conditioned on the value of another sensor or different situations such as weekends, maintenance periods, special experimental runs, or emergency conditions. The logged values are stored in a database and can be called up at any time by the computer system for a playback through either the graphic display generator of the system which either displays the information in conjunction with a set of various shapes or displays the information in a spread sheet.

The data that is picked up by the logging operation can be displayed in a high-resolution color graphic display system that uses a graphic monitoring function. This operation allows the operator to focus on any particular portion of the plant operation and to ask for an immediate graphic display of all related variables on a full-color schematic. The color schematic is constructed so as to provide a schematic diagram of various portions of the manufacturing operation. The construction of such graphics utilitizes the same computer program as that marketed by Centec Corporation under the tradmark "CHEETAH." Once the various shapes and symbols have been constructed for the graphic display, in accordance with the system of the present invention, various sensors are tied to different shapes and symbols on the graphic display so that such components of the display change as the readings from the various sensors change.

For example, if there is a graphic display representing a boiler, the display of the boiler can change such that a rectangle representing the boiler is filled to varying extents depending upon the quantity of liquid in the boiler and the color of the filled area varies depending upon the temperature of the liquid in the boiler.

In this description, various terminology is utilized and for the sake of convenience, each of these terms will be briefly described. The logger or logging operation that is referred to is the operation of communicating with the various programmable controllers or process control computers within the manufacturing facility for periodically obtaining the information from such controllers are computers depending upon a particular logging model in operation for reading and storing the states of various sensors within the system. A logging model is a specification of data sampling and recording strategy that is constructed by the operator of the system. There may be any number of logging models although only one logging model can be active at any specific time. The direct sensor entry refers to the capability of an analytical model within the system to accept sensor values directly from the logging system. The direct sensor entry analytical module is a calculation tool that has the features of an electronic spread sheet such as Visicalc and Lotus 1-2-3 plus the ability to use data directly from sensor readings and special analytical graphics.

Through the utilization of the system of the present invention, it is possible to graphically see how an area of the plant or a specific piece of equipment was operating at some point in the past, such as an hour ago, a day ago, or months before hand. The system includes an historical playback mode which enables the operator to select some historical time period for which information is stored in the database and from that time forward to page through time watching how a problem developed. This particular aspect of the system is excellent for enabling an historical analysis of operational problems.

The logging operation of the system of the present invention is resident within the computer throughout the operation of the system. This logging process continually operates in the background mode of the computer operation. The logging process is initiated automatically when the system is turned on and remains active and requests data from the process controller as directed by the user of the system predicted on the particular logging model called into operation.

In constructing a logging model, there are various types of sensor information that can be incorporated in to each logging model. An analog sensor reading provides information over a continuous range of value. A discrete or digital sensor provides only two values, either 0 or 1 (where 1 is equivalent to true and 0 is equivalent to false in a logic statement); if the discrete sensor reading is a direct reading from a sensor, it can be indicative of an on or off condition of a particular part of the system that is sensed by the sensor. A derived analog sensor is a value that is treated as a sensor reading but is actually calculated from other sensor readings or other derived sensor readings. A derived digital sensor is again an expression made up of other sensors which is treated as a sensor reading but only has two values, either 0 or 1. The logging criteria utilized in constructing the logging model is a set of conditions under which a sensor value will be added to the logging database. In the operation of the logging process, the criteria can be a tim interval, a percentage or absolute value change, or the logging of another "tie-to" sensor. The logging model is a formatted tabulation of data that instructs the logging operation when to record various sensor values. A logging operation is a set of logging criteria that specify how sensor values are to be read and recorded.

BRIEF DESCRIPTION OF THE DRAWINGS

FIG. 1 is a block diagram of the hardware components of the computer manufacturing management control system of the present invention.

FIG. 2 illustrates the various software modules that are utilized for making up the computer system of the present invention.

FIG. 3 provides an overall block diagram illustrating how the logging operation records data.

FIG. 10 and FIG. 11 illustrate the construction process of the graphic display program for building graphic shapes for display on a display monitor and connecting the shapes to various sensor states.

FIG. 12 shows how the graphic display generator displays various graphics that are tied to various sensor states.

FIG. 13 sets forth further details of the operation for initiating a new reading function within the process of the operation shown in FIG. 12.

FIG. 16 and FIG. 17 show the operation for recovering the value from the logging operation when requested in both real time and historical modes of operation.

FIG. 18 shows how a list of required sensors for a graphic display operation are passed to the logging process.

DETAILED DESCRIPTION OF THE PREFERRED EMBODIMENT

Figure 4:
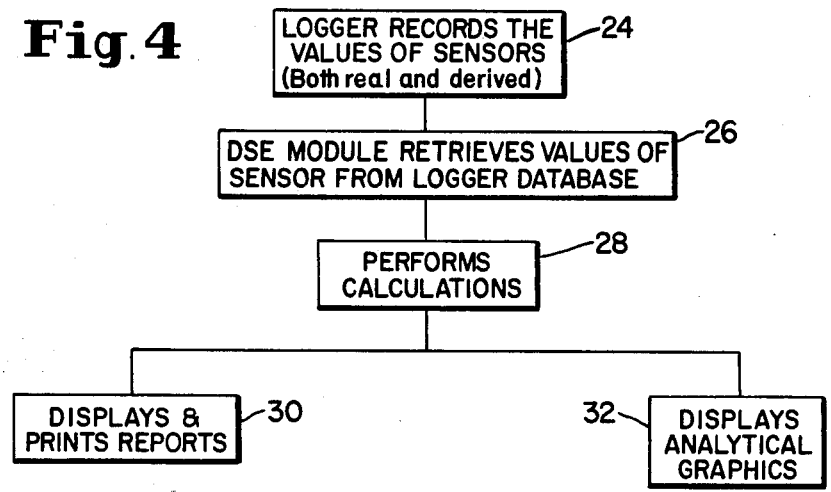
FIG. 4 provides a block diagram showing the relationship between the logging operation and the direct sensor entry analytical module.
Figure 5:
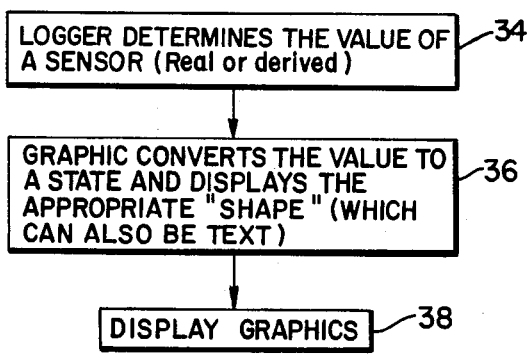
FIG. 5 is a block diagram that shows the basic relationship between logger and the graphic generator and display operation.

The present invention provides a computer manufacturing management monitoring system for recording and maintaining records of operation conditions sensed by a plurality of sensors that detect various states relating to a process being monitored. The hardware components of this system are shown in FIG. 1 and the basic computer software components are shown in FIG. 2.

In accordance with a primary aspect of the system of the present invention, the input section is arranged to be coupled to a plurality of sensors for monitoring the states of such sensors. A logging program periodically reads the states of various sensors and stores information relating to each such sensor state in a database both as direct sensor readings and as derived sensor information calculated from readings of the sensor states of certain of the sensors. A database storage section stores the information received from the logging program relating to the reading of each sensor state read in a database format. A display generator causes information to be displayed from the database on a display screen. A control program controls the operation of the logging program for determining which of the sensors should be read, when such sensor should be read and whether the readings from each sensor should be stored as a direct value or used for calculating a derived value that should be stored in the database.

A logging model construction program is used for constructing a plurality of different logging models. Each logging model contains a list of the particular sensors to be read and information regarding when such particular logging model should be invoked during the operation of the process being monitored. The logging model construction program enables a logging model to be constructed so that information obtained from each of the various sensors being monitored can be stored in any one of the following forms as analog information, digital information, derived analog information, and derived digital information. The control program controls the logging program through a plurality of logging models by selecting a particular logging model to call into operation and logging data through the logging program based upon the particular selected logging model.

The graphic display generating program includes a graphic construction program for constructing a graphic display having a plurality of shapes with at least certain of the shapes being associated with various sensors for varying the display of such shapes in dependence upon the readings obtained from such sensors. The display generating program causes at least certain of the displayed shapes to vary as to one of the following characteristics: size, color, and fill content.

An overall block diagram of the computer hardware utilized in the present invention is shown in FIG. 1. The central processing unit (CPU) 2 forms the heart of the computer system. The CPU 2 communicates with the various process control interfaces for the manufacturing operation. Process control interfaces 4 are coupled to the various sensors that are spaced along the various stages of the manufacturing operation for sensing various process conditions within the operation. The various types of measurements that can be taken within the manufacturing operation include, for example, information such as temperature, pressure, flow rates, quantity of liquid, positions of parts, settings of relays, and information regarding the particular products being produced at a particular point in time in the operation.

A keyboard 6 (or touch screen or other input device) enables the production staff, i.e., the operators, to provide information to CPU 2 such as information for sending various control signals to the process interfaces, constructing the various logging models, and interrogating the system for displaying various types of information. A display screen 8 is connected to an output of the CPU 2. In addition, a printer 12 can be connected to another output of CPU 2. The information from the CPU that is to be stored in stored in a data storage system 10. Data storge system 10 can be and normally would be a hard disk drive system, such as a 10 or 20 megabyte hard disk drive.

FIG. 2 sets forth the basic software modules, or components, of the computer software system utilized in the present invention. This system provides the overall control of the various operations of the computer manufacturing management monitoring system of the present invention. The active portion of the computer software system is resident within CPU 2 (FIG. 1) during operation. The information from process interfaces 4 is obtained through a set of input/output lines from the CPU that are interrogated by logger module 14. Logger 14 is controlled by controller 16. A graphic generator 18 provides for the various graphic displays on display screen 8. A database 20 provides for the storage of information in a database format withn data storage system 10. A direct sensor entry analytical module 22 provides the mechanism for processing and analyzing the various information read by the various sensors within the system. These various modules will be described in greater ddetail further below.

FIG. 3 shows the relationship between logger 14 and the various logging models that can be constructed by the operators of the system. While it is logger 14 that communicates with the process interfaces 4 for interrogating various sensors for reading such sensors, the operation of logger is controlled in accordance with the particular logging model that is in operation at any particular point in time. The system allows for a plurality of various logging models to be constructed and then based upon either various commands by the operator or various operating conditions that occur for any one of the logging models to be called into operation.

A logging model tells logger 14 which sensors to sample and the criteria for entering the information from the sensors into the data base. Each logging model can be invoked from the keyboard, the clock, or by a sensor reading. The sensor reading can be either real or derived.

It is possible for an operator to build many different logging models, with each logging model being appropriate for a specific product run or plant operating condition. It is also possible for the operator to construct special logging models such as for experimental plant runs or for trouble-shooting various aspects of the manufacturing process.

For each sensor in the logging model, it is necessary to specify when the sensor should be read and the criteria for entering the reading into the database. Exemplary of the specifications for reading the sensor and logging information are: (1) if at a specific time interval; (2) if the reading from the sensor changes by a specific percentage or amount; (3) if information is being logged from another sensor; or (4) any combination of these three options. By the use of a derived discrete variable that is turned on when an analog variable is in a specific range, it is also possible to cause recording to begin at a specific sensor value. If time is chosen as a criteria for logging the sensor reading, then it is necessary to specify the number of seconds to lapse between each logging operation. If percentage of change is chosen as the logging criteria, then it is necessary to specify both a percentage value and a sampling rate. The particular sampling rate that is entered determines when the logger will check to see if the percentage value is exceeded. If the variable value changes more than the specified percentage over the specified time period, then the information from the sensor will be logged; otherwise, it is not logged. The logger module uses the last recorded value of the sensor as the basis for testing the percentage change.

If the logging model determines that the information to be logged is predicted on the reading of another sensor, then the information from a particular sensor is always logged when another sensor that is specified is logged. For example, it is possible to have the temperature logged only when the pressure is logged.

In FIG. 4, the relationship between the logger and the direct sensor entry module is illustrated. The log records that are stored, both real and derived sensor readings, from box 24 are supplied to the direct sensor entry module 26 from the logger database. Various calculations then are performed as represented by box 28 and the information from such calculations then can be graphically displayed either in a spread sheet format on a display screen or in a printed report such as represented by box 30 or in a graphic display where various shapes are tied to various sensors as represented by box 32.

In displaying the information graphically, the logger program first determines the value of a sensor (34) and such information is then converted by the graphic display program for displaying the appropriate shape and value. This information then is displayed as represented by box 38.

Figure 6:
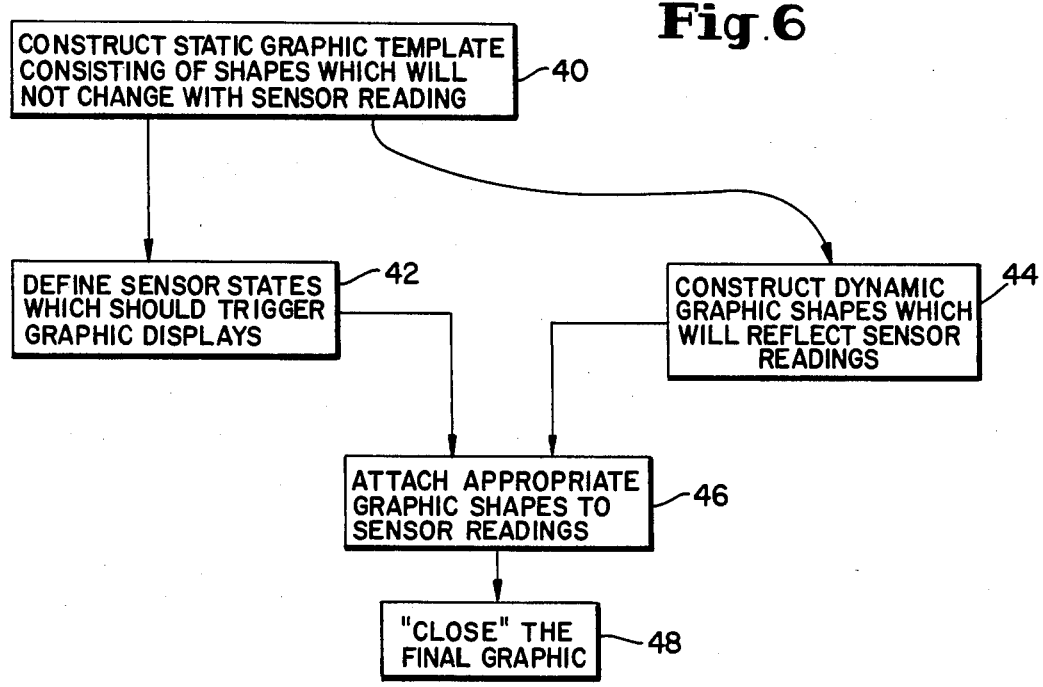
FIG. 6 is a block diagram that sets forth the basic steps in creating the graphic displays.
Figure 19:
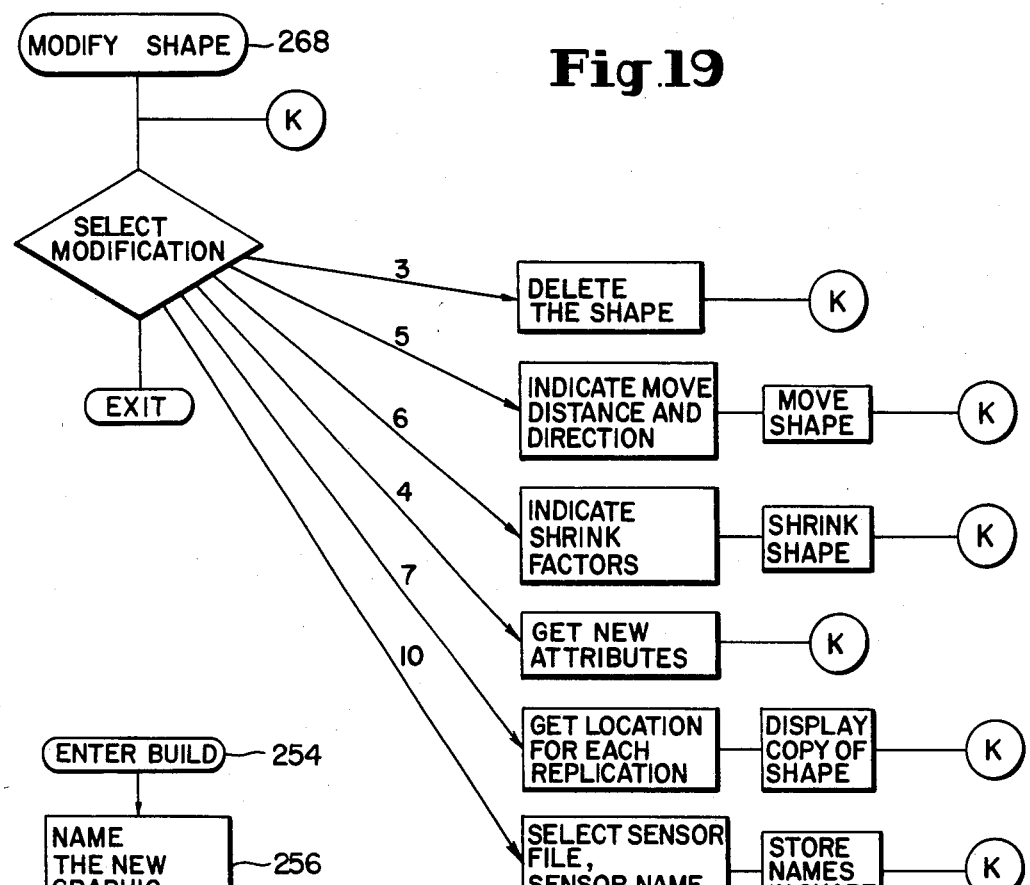
FIG. 19 sets forth the procedure for modifying the various graphic shapes selected.
Figure 20:
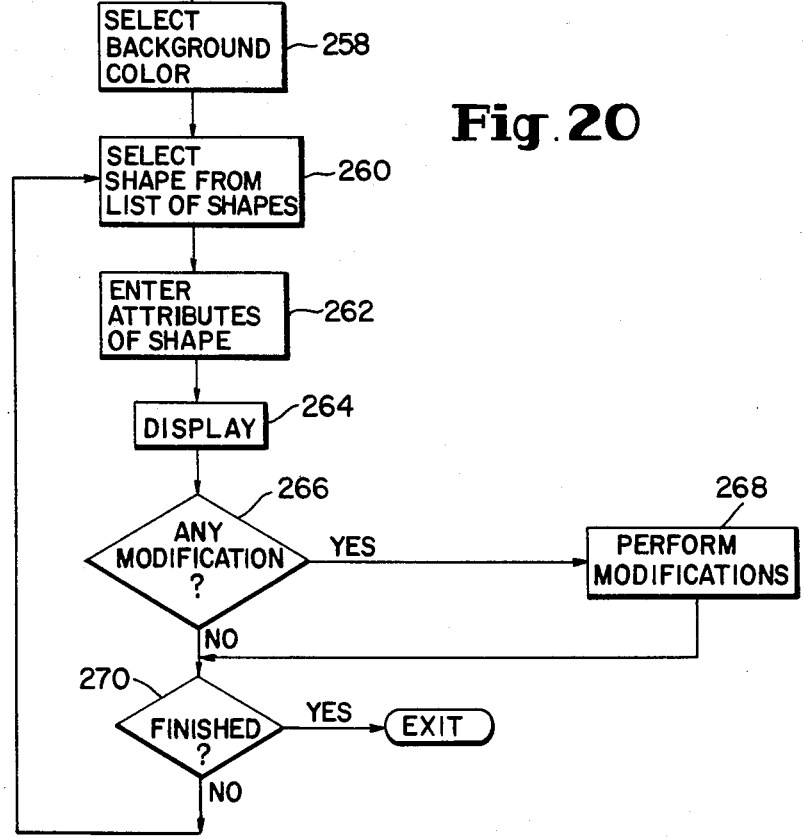
FIG. 20 sets forth the procedure for building a desired graphic display with a plurality of various shapes.

FIG. 6 shows the four major steps in creating the process graphics with the graphic display module of the software system of the present invention. The construction of the various graphic templates uses routines of the "CHEETAH" computer program. The routines of the graphic display module are shown in FIGS. 19 and 20. The graphic display modules includes the processes that are shown in the various stages of boxes 40, 42, 44, 46, and 48. In constructing the various graphics, the static graphic templates are constructed from various shapes which will not change with the various sensor readings. Various sensor states then are defined which trigger changes in the graphic displays. Sensor states act to trigger the dynamic graphics which are constructed so that the display of the shapes vary with and reflect various sensor readings. These dynamic graphics overlay the static graphics so as to provide the overall display desired. The various graphic shapes, therefore, are appropriately tied to various sensor readings. Once this graphic display construction period is completed, the program for constructing such graphics is closed and the graphic display is finalized.

Returning to FIG. 2, the following sets forth a more detailed explanation of the various software modules which make up the invention and the structure by which they interact. To utilize the invention there must be some point through which the data from the sensors can be accessed. These points are one or more process interfaces 4. A controller module 16 provides the interface with the operator and manages the software modules in accordance with the desires of the operator. The logger module 14 communicates with the process interface 4 extracting data and sending commands as directed by the requirements of graphic generator 18 and the direct sensor entry (DSE) analytical module 22. Logger module 14 records the extracted data in the database 20.

Graphic generator 18 provides graphic depictions of the data to the construction of templates which consist of various shapes to be display on display screen 8. Such shapes may be either static, that is independent of the data stream, or dynamic in that they change their value or display characteristics according to the data being received from the sensors. The graphic generator 18 can display the requeted data as it is sampled by the logger program. In the historical mode of operation, the graphic generator displays data from the database that has been previously read and recorded by the logger program. The displays and appearance to the user are identical in whichever mode the graphic generator operates with the only difference being the source of the data.

The DSE analytical program 22 also displays data in two forms, either in a real time mode of operation, as the data is being received, or in an historical mode from the database.

As shown in FIG. 3, logger program 14 receives its instructions for sampling data from a logging model. The logging model sets forth the sensors, the rate and conditions of sampling of the sensors, and the conditions for logging the sensor values to the data base. A plurality of different logging models may be built, each model being appropriate for specific process conditions. Only one logging model for controlling logger program 14 may reside in the CPU at one time. However, various logging models may be automatically exchanged on the basis of sensor readings, time, or on instructions from the keyboard.

Logger 14 recognizes and records four types of sensors: an analog reading, a discrete reading (on or off switch or digital), a derived analog value, which is a calculated value from other sensor readings, and a derived discrete which is a discrete value based on the truth of a Boolean expression. The values of all four sensors may be used to trigger new logging models and, as will be discussed below, new command sets.

Logger 14 performs its tasks in a background mode of operation in CPU 2 allowing other functions such as operation of the graphic generator 18 and the DSE analytical program 22 to be utilized while logging of the process variables continues to occur.

In addition to receiving data from the process interface and exchanging various logging models, logger 14 also may send values to various process controllers, process computers, or other devices which may be used to manipulate the manufacturing process being monitored. These values are various commands signals. Command signals may be combined to form a file which contains a number of instructions for changing several values of the controllers. This combination of command signals is referred to as a command set. Such sets of values also are often called recipes and may be used to simultaneously change a range of controller conditions.

Graphic generator 18 can be operated in both construction and display modes of operation. In the construction mode, which is shown in FIGS. 19 and 20, new graphic templates are built and the graphic shapes are tied to, or associated with, sensor values and states. In the display mode of operation, the sensor readings are taken and displayed according to the instructions provided from the construction mode.

The DSE analytical program 22 operates in a similar fashion. Data that is acquired by logger 14 will be analyzed in both tabular and graphic formats in the display mode. In the construction mode, the sensors which are to be used in the tabular reports are specified, along with the required calculations.

The database 20 constructed from information received from logger 14 has a common format regardless of the controllers or process computers used to obtain the data.

Figure 7:
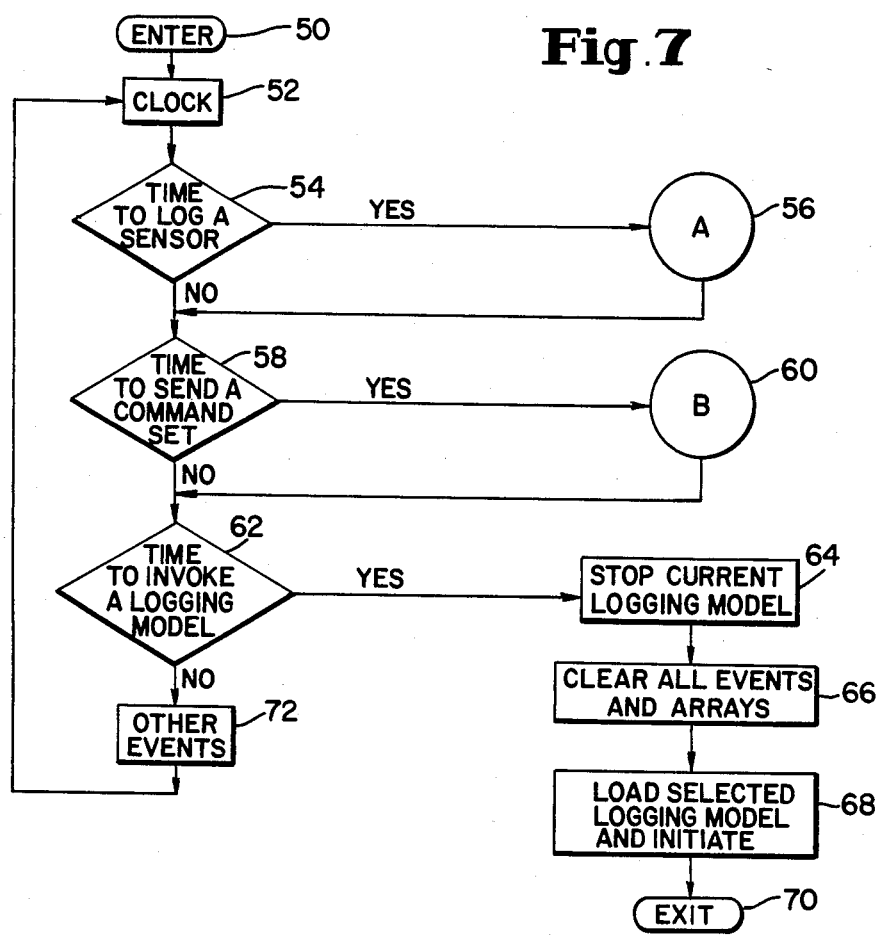
FIG. 7 sets forth an overview of the components of the program for logging and recording the data.

As shown in FIG. 7, the logger system enters the program at block 50 and first reads the computer clock 52 to determine if it is time to log a sensor (54). If the answer is "yes," logger moves to routine A (56) and takes the action shown in FIG. 8. If the answer is negative, logger then determines if it is time to send a command set (58). If the answer is "yes," logger then goes to routine B (60) and follows the detailed procedures shown in FIG. 9. If the answer to the questions posed in blocks 54 and 58 are negative, logger then asks if it is time to invoke a logging model (62). If the answer is "yes," logger stops the current logging model (64), clears all events and arrays (66) and loads the new logging model (68). It then exits (70) and returns to its normal processing of instructions. If the answer to block 62 is "no," then logger proceeds to process other events. At the completion of those events, it returns to the clock (52) and the procedures shown in FIG. 7 are repeated.

Figure 8:
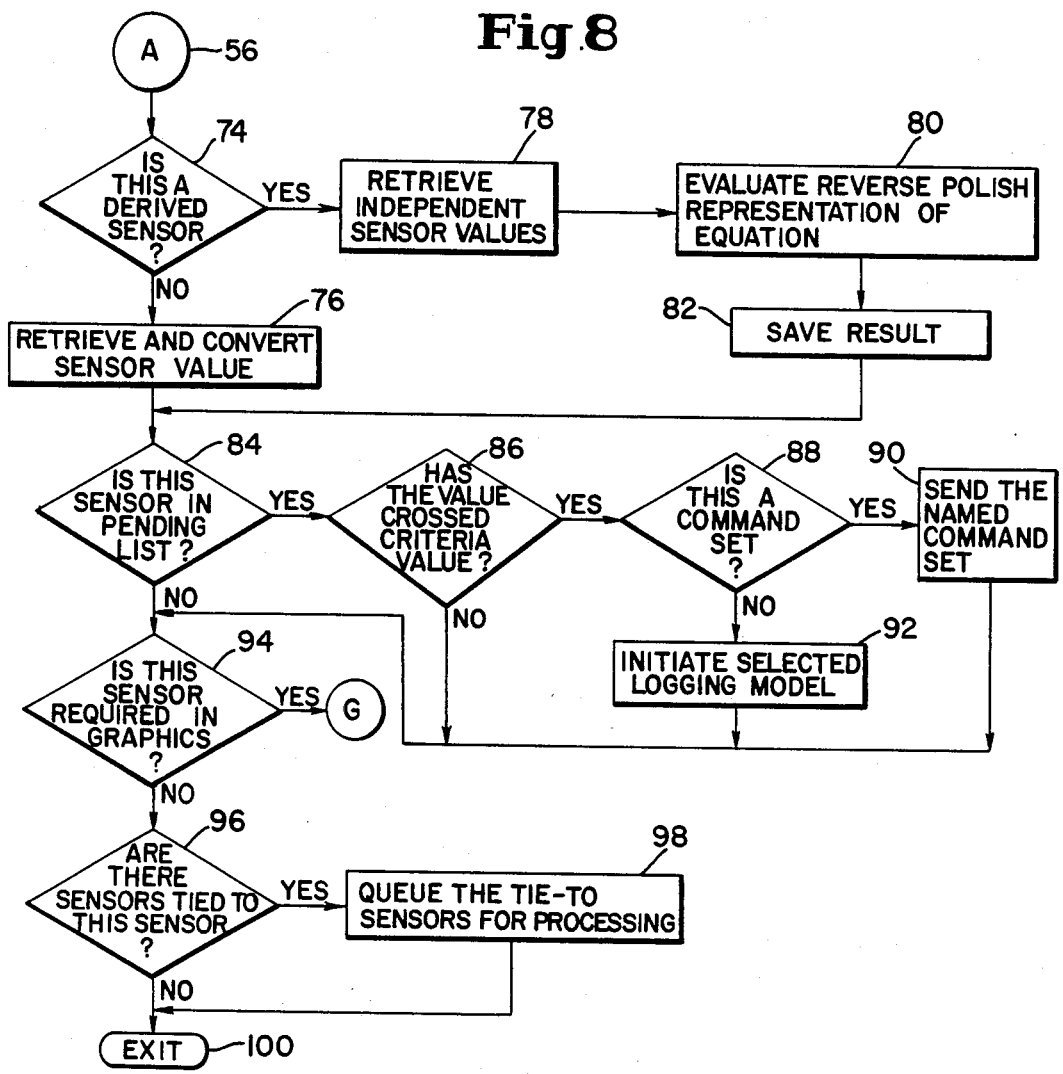
FIG. 8 sets forth the components of the program for reading the values of the sensors and determining what actions are appropriate to be carried out as a result of such readings.

FIG. 8 shows in more detail the methodology used to log a sensor. A determination (74) is first made if the sensor to be recorded is derived from other sensor readings or a direct reading of a sensor. If it is a derived sensor, logger retrieves all of the independent sensor values required to evaluate the derived sensor (78). These values then are placed in a reverse representation, the equation is evaluated (80), and the result saved (82). If the sensor is not derived, the system then retrieves the sensor value from the data interface (76).

Logger next checks to see if either the derived sensor value of the retrieved real sensor value has been specified as one which would cause a change in logging models or command sets, i.e., whether the sensor is in the pending list (84). If the answer is "yes," the system next checks to see if the value has crossed the criteria which was set for the triggering action (86). If the answer is once again "yes," the system determines if it is a logging model or a command set (88). If it is a command set, the system then sends the named command set to the process interface (90). If it is not a command set, the system then initiates the selected logging model (92).

If the sensor has not crossed the criteria value, the system then checks to see if the sensor is required in the current graphic template (94). If the answer is "yes," the sensor value is passed to the graphic display module shown in FIG. 6 (routine G). If the answer is "no," the system checks to see if the sensor being read has been specified as a tie-to sensor (96). If the answer is "yes," the system then finds the tie-to sensors for logging (98). If the answer is "no," the system exits (100) and returns to the actions shown in FIG. 7, having completed all of the tasks included in routine A under FIG. 8.

Figure 9:
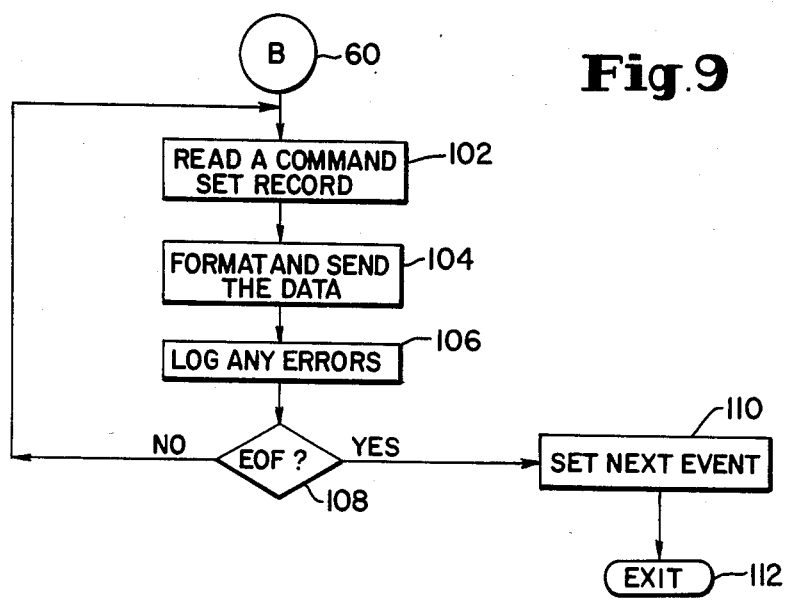
FIG. 9 sets forth the steps of the program for issuing commands back to the data source.

If the comparison in block 58 of FIG. 7 shows that it is time to send a command set, the system then performs routine B (60), the functions shown in FIG. 9. The system first reads the command set record (102) and then formats the record and sends the new command parameters (104). In addition, logger records any communication errors (106) which indicate that the command set record was not sent and then checks to see if there are other records in the command set file. If the answer to "End of File Comparison (EOF)" if "no," the system then reads the next command record. At the end of the command set file, i.e., EOF is yes, then the system proceeds to set the next event (110) and exits (112) returns to (94) as shown in FIG. 9.

FIGS. 19 and 20 show how a sensor state is attached to a graphic shape and a sensor list is associated with each graphic template.

Figure 10:
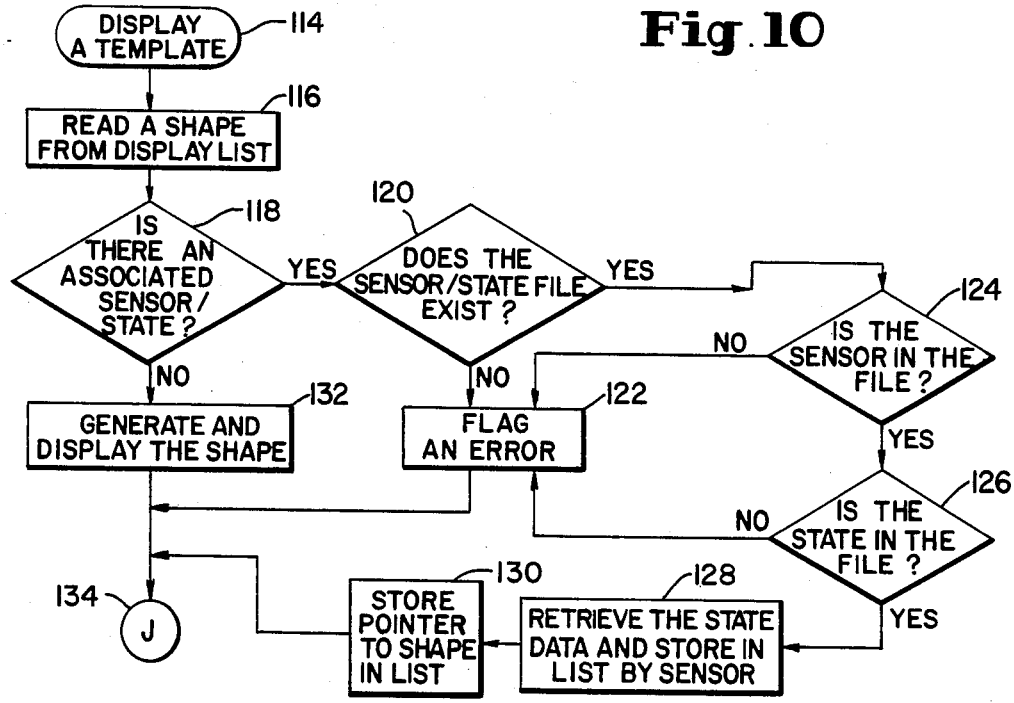

FIGS. 10 and 11 show the methodology used to generate graphic files which will display shapes within a graphic template in conjunction with an associated sensor state. As the constructed graphic template is displayed (114), each shape is read (116) and checked to see if there is an associated sensor state (118). If there if no associated sensor state, the shape is immediately generated and displayed (132). If there is an associated sensor state, the system confirms that an appropriate sensor state file exists (120), that the sensor is in the file (124), and that the state of the sensor is in the file (126). If the state is in the file, the system then retrieves the state data and stores it in a list with the sensor (128). A pointer to the shapes is also stored (130). If any of the answers in boxes 120, 124, or 126 are "no," the system then flags an error (122) to the user. Once the appropriate graphic shape sensor and state are assembled, the system then writes a compressed screen file (136) and a compressed sensor state list (138) (routine J, FIG. 11). These two files are constructed to create a rapid display of both the graphic template and the associated sensor state. When the graphic is called for display, the compressed graphic file is displayed. The compressed sensor list (138) is then sent to the graphic/logger interface (140).

FIG. 12 shows at display time how the system provides the right sensor values and sensor state graphics for display on the graphics screen in either the historical mode or the real time mode of operation. FIGS. 13 through 18 show details of various activities of the program section shown in FIG. 12.

Figure 14:
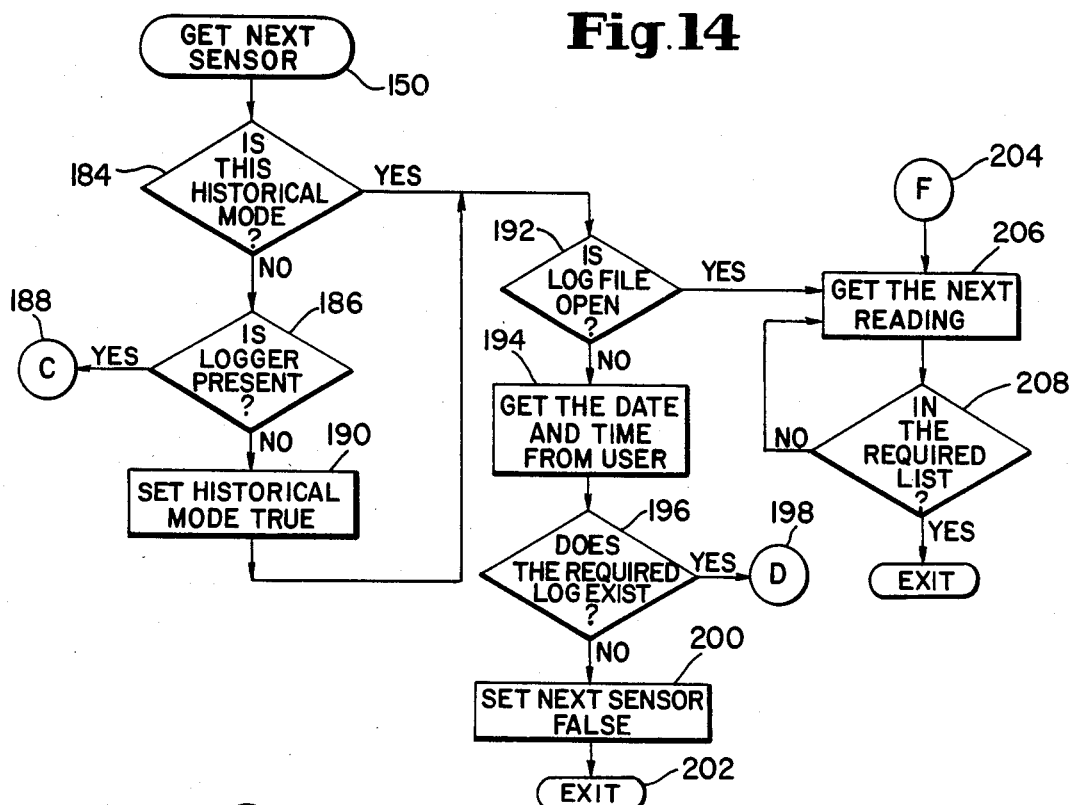
FIG. 14 shows further details of the Get Next Sensor function shown in FIG. 12.
Figure 15:
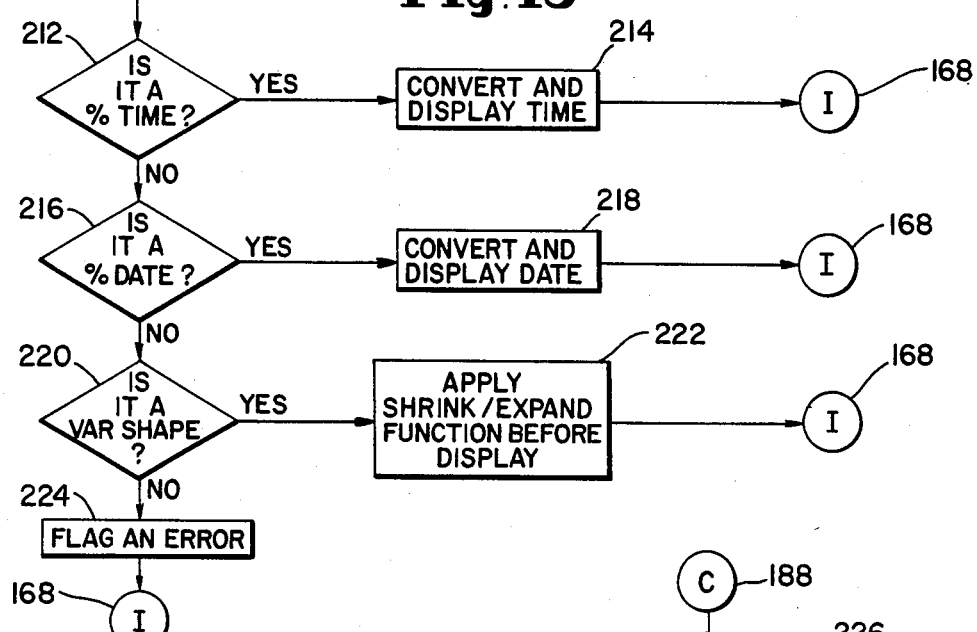
FIG. 15 shows further details of the display functions of a portion of the operations shown in FIG. 12.

From the template listing of sensors and associated shapes the graphic display system (routine G, 142) continually samples to see if any new reading is available (144). This is shown in box 144 of FIG. 12 and in more detail in FIG. 13. If a reading is available, the system then proceeds to get the next sensors (150) to which the reading might apply after first checking the keyboard (146) to see if the operator has indicated the wish to terminate monitoring by pressing the escape key. (A more detailed presentation of the functions of box 150 is shown in FIG. 14 and will be discussed below.) After having found the next sensor, the system checks the sensor state list (152) and obtains the appropriate first state from the list (154). It then performs a check to see if the sensor is in the state specified (156). If the answer is "yes," the system retrieves the associated shape (158) and checks to see if it is a numerical value to be displayed (160). If the answer it "yes," if then converts and displays the value (164). If the associated shape is not a value, the system then goes to routine H (162) and performs the detailed functions shown in FIG. 15.

In routine H, the program first checks to see if it is a time value (212) then a data value (216) or if it is a variable shape (220). If it is a time value, it converts and displays the time (214). If it is a date, the system then converts and displays a date (218). If the shape is a variable shape, that is, one that can change size with value, it applies a shrink/expand function (222) before displaying the shape. If the system has determined that the shape to be displayed is not any of these, it simply displays the shape unchanged (224). The program then returns to point I (168) in FIG. 12. As shown in FIG. 12, the system then proceeds to find the next state in the sensor state file (166). If it is at the end of the list (170), it returns to monitoring for a new reading.

The method by which the graphic display module determines if there is a new reading (144) available is shown in FIG. 13. The system first checks to see if logger is present (174). If the answer is "yes," it then determines if there are any readings available (176). If there are no readings available, the system sets the new reading false (178) and returns (182) as shown in FIG. 12. If there is a new reading the system sets the new reading true and proceeds as shown in FIG. 12. If a new reading is present the system proceeds to associate the value with the sensor state.

Figure 16:
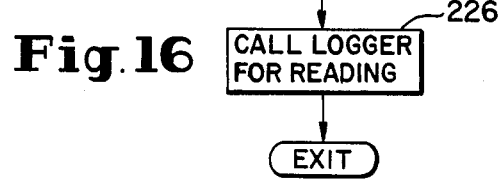

FIG. 14 shows in more detail the activites summarized in box 150 of FIG. 12. Referring to FIG. 14, the system first determines if the user has specified historical retrieval (184) from the database or wishes to monitor in real time. If the answer to the check on historical mode (184) is "yes," the system first checks to see if the log file is open (192). If the log file is not open the system obtains the date and time from the user (194) confirms that there is a log available (196) and opens the log and obtains the data as shown by routine D in FIG. 17. If the file is open, the system obtains the readings (206) and determines if they are in the required list (208). If they are, it then proceeds to box 152 in FIG. 12. If the answer to the check in box 184 of FIG. 14 is "no," the system then checks to see if a logger module is present (186) and goes to routine C (188). If the logger module is not present it reverts to historical mode (190). If logger is present, the system proceeds to call the log up for reading (226) routine C as shown in FIG. 16.

In routine D (198) set out in FIG. 17, the log file is opened (230). Next the record in the log file is read (232). The information from each file read is checked to determine if the date/time in the record corresponds to the date/time of the record being searched for. When the correct record is found, the system goes to routine F (204) in FIG. 14.

FIG. 18 sets forth a routine that forms a portion of passing the sensor list routine (140) shown in FIG. 11. Set sensor list (236) serves to build the list of sensor information that is needed for the graphic display. The sensor list required for the screen display is passed to the data control system (238). If logger is present and coupled to the graphic display generator (240), then the sensor list is passed to logger (242) and compared to the logging model in operation (244). If the sensor list does not match the logging model, then an error flag (246) is provided. If logger is not present, then the list is saved for the historical mode of operation (248) for later playback.

The routine used in constructing the graphic displays is shown in FIG. 20 with the commencement of entering the build routine (254). First the graphic display is named (256). Next the background color for the display is selected (258) and the various shapes are selected (260). The attributes of the shapes are entered (262) and displayed on the screen (264).

If any modifications are to be made to the selected shape (266), then the function block 268 for performing such modifications is called in. The modification routine is shown in FIG. 19. FIG. 19 also sets forth other operations for varying the display that can be utilized and called into operation.

Once the construction of the graphic display is finished (270) the program exits from the routine.

The present invention may be embodied in other specific forms without departing from the spirit or essential characteristics thereof. The present embodiment is presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. A monitoring system for recording and maintaining records of operation conditions sensed by a plurality of sensors that detect various states relating to a process being monitored, said monitoring system comprising:

input means arranged to be coupled to a plurality of sensors for monitoring the states of such sensors;

logging means for periodically reading the states of various sensors and storing information relating to each such sensor state in a database storage means both as direct sensor readings and as derived sensor information calculated from readings of the sensor states of certain of the sensors;

database storage means for storing information received from said logging means relating to the reading of each sensor state;

display generating means for generating information to be displayed from the database storage means on a display means; and control means for controlling operation of said logging means for selecting which of the sensors should be read, determining when said selected sensor should be read and deciding whether the readings from each selected sensor should be stored as a direct value or used for calculating a derived value that should be stored in said database storage means.

2. A monitoring system according to claim 1 further comprising:

logging model construction means for constructing a plurality of different logging models, each logging model containing a list of particular sensors to be read and information regarding which particular logging model should be invoked during operation of the process being monitored, said logging model construction means enabling a logging model to be constructed so that information obtained from each of the various sensors being monitored can be stored in any one of the following forms as analog information, digital information, derived analog information and derived digital information and wherein said control means operates said logging means through a plurality of logging models by selecting a logging model to call into operation and logging data through said logging means based upon the selected logging model.

3. A monitoring system according to claim 1 wherein said display generating means includes graphic construction means for constructing a graphic display having a plurality of shapes with particular shapes being associated with particular sensors for varying the display of such shapes in dependence upon the readings obtained form such sensors.

4. A monitoring system according to claim 3 wherein said display generating means varies the displayed shapes in accordance with any of the characteristics of size, color and fill content.

5. A monitoring system according to claim 4 further comprising:
   logging model construction means for constructing a plurality of different logging models, each logging model containing a list of particular sensors to be read and information regarding when a particular logging model should be invoked during the operation of the process being monitored, said logging model construction means enabling a logging model to be constructed so that information obtained from each of the various sensors being monitored can be stored in any one of the following forms as analog information, digital information, derived analog information and derived digital information; and wherein said control means operates said logging means through a plurality of logging models by selecting a logging model to call into operation and logging data through said logging means based upon the selected logging model.

6. A monitoring system for recording and maintaining records of operation conditions sensed by a plurality of sensors that detect various states relating to a process being monitored, said monitoring system comprising:
   input means arranged to be coupled to a plurality of sensors for monitoring the states of such sensors;
   logging means for periodically reading the states of various sensors;
   control means for controlling operation of said logging means for selecting which of such sensors should be read, determining when each said selected sensors should be read and deciding whether the readings from each selected sensor should be stored as a direct value or used for calculating a derived value that should be stored in said database storage means;
   database storage means for storing information received from said logging means relating to the state of each sensor read; and
   graphic display means including graphic construction means for constructing a graphic display having a plurality of shapes with particular shapes being associated with particular sensors for varying the display of such shapes in dependence upon the readings obtained from such sensors.

7. A monitoring system according to claim 6 wherein said graphic display means includes historical playback means for enabling previously stored information provided to said database means from readings obtained by said logging means to be retrieved from said database means for playback through a selected graphic display.

8. A monitoring system according to claim 7 wherein said display generating means varies the displayed shapes in accordance with any of the characteristics of size, color and fill content.

9. A monitoring system for recording and maintaining records of operation conditions sensed by a plurality of sensors that detect various states relating to a process being monitored, said monitoring means comprising:
   input means arranged to be coupled to a plurality of sensors for monitoring the states of such sensors;
   logging means for periodically reading the states of various sensors;
   logging model construction means for constructing a plurality of different logging models, with each logging model containing a list of particular sensors to be read and information regarding when a particular logging model should be invoked during operation of the process being monitored; and
   control means for operating said logging means through a plurality of logging models by selecting a logging model to all into operation and logging data through said logging means based upon the selected logging model.

10. A monitoring system according to claim 9 wherein said logging model construction means enables a logging model to be constructed so that information obtained from each of the various sensors being monitored can be stored in any one of the following forms as analog information, digital information, derived analog information and derived digital information.

11. A monitoring system according to claim 9 wherein said control means further includes command set means for sending command setting signals to various process controllers controlling the process being monitored thereby varying the operation of such process when certain logging models are called into operation.

12. A monitoring system according to claim 11 further comprising display generating means including graphic construction means for constructing a graphic display having a plurality of shapes with particular shapes being associated with particular sensors for varying the display of such shapes in dependence upon the readings obtained from such sensors.

13. A monitoring system according to claim 12 wherein said display generating means varies the displayed shapes in accordance with any of the following characteristics of size, color and fill content.

14. A monitoring system for recording and maintaining records of operation conditions sensed by a plurality of sensors that detect various states relating to a process being monitored, said monitoring system comprising:
   input means arranged to be coupled to a plurality of sensors for monitoring the states of such sensors;
   logging means for periodically reading the state of various sensors;
   logging model construction means for constructing a plurality of logging models for selecting which sensors are to be read by said logging means and determining a time and condition under which each of such selected sensors should be read;
   database storage means for storing information read by said logging means; and
   graphic display means for generating information from the database storage means to be displayed on a display means.

15. A monitoring system for recording and maintaining records of operation conditions sensed by a plurality of sensors that detect various states relating to a process being monitored, said monitoring system comprising:

input means arranged to be coupled to a plurality of sensors for monitoring the states of such sensors;

logging means for periodically reading the states of various sensors;

logging model construction means for constructing a plurality of different logging models, each logging model including a list of particular sensors to be read by said logging means and a time and condition under which each of such sensors should be read;

database storage means for storing information received from said logging means relating to the states of the sensors read by said logging means; and control means for selecting a logging model to bring into operation for controlling operation of said logging means.

16. A monitoring process for recording and maintaining records of process operation conditions sensed by a plurality of sensors that detect various states relating to the process being monitored, the monitoring process comprising:

interrogating a plurality of sensors for detecting the states of such sensors;

logging the state of each interrogated sensor and storing information relating to each such sensor state in a database both as direct sensor readings and as derived sensor information calculated from readings of the sensor states of certain of the sensors;

displaying information from the database on a display mechanism; and controlling the logging operation for selecting which of the sensors should be read, determining when such sensor should be read and deciding whether the readings from each sensor read should be stored as a direct value or used for calculating a derived value that should be stored in the database.

17. A monitoring process for recording and maintaining records of process operation conditions sensed by a plurality of sensors that detect various states relating to the process being monitored, the monitoring process comprising:

interrogating a plurality of sensors for monitoring the state of each such sensor;

logging the states of various sensors;

controlling the logging operation for selecting which of the sensors should be read, determining when each such sensor should be read and deciding whether the reading from each sensor should be stored as a direct value or used for calculating a derived value that should be stored in the database;

storing information received by said logging operation relating to the state of each sensor interrogated;

constructing a graphic display having a plurality of shapes with particular shapes being associated with particular sensors for varying the display of such shapes in dependence upon the readings obtained from such sensors; and displaying certain of the stored information from the sensors through a constructed graphic display on a display screen.

18. A monitoring process according to claim 17 further comprising displaying historical information previously stored in a database from readings obtained by the logging operation through a selected graphic display.

19. A monitoring process for recording and maintaining records of process operation conditions sensed by a plurality of sensors that detect various states relating to a process being monitored, the monitoring process comprising:

interrogating a plurality of sensors for monitoring the state of each such sensor;

logging the states of various sensors;

constructing a plurality of different logging models with each logging model containing a list of particular sensors to be read and information regarding when such particular logging model should be invoked during the operation of the process being monitored; and controlling the interrogating and logging operations through a plurality of logging models by selecting a logging model to call into operation and logging data based upon the selected logging model.

20. A monitoring process according to claim 19 further comprising a command control operation for sending command setting signals to various process controllers controlling the process being monitored thereby varying the operation of such process when certain logging models are called into operation.

21. A monitoring process for recording and maintaining records of process operation conditions sensed by a plurality of sensors that detect various states relating to a process being monitored, the monitoring process comprising:

interrogating a plurality of sensors for monitoring the state of each such sensor;

logging the states of various sensors;

constructing one or more logging models for determining which particular sensors are to read by the logging step and a time and condition under which each of such particular sensors should be read;

storing information read by the logging step in a database; and displaying information from the database in either a chart format or as a graphic display on a display screen.

22. A monitoring process for recording and maintaining records of process operation conditions sensed by a plurality of sensors that detect various states relating to a process being monitored, the monitoring process comprisingg:

interrogating a plurality of sensors for monitoring the states of such sensors;

logging the states of various sensors;

constructing a plurality of different logging models, each logging model including a list of which particular sensors are to be read by the logging step and a time and condition under which each of such sensors should be read;

storing information received from the logging step relating to the states of the sensors read in a database; and selecting a particular logging model to bring into operation for controling the logging operation.

23. A data processing monitoring system including a digital computer having input/output means, a memory and logic means and a display screen for recording and maintaining records of operation conditions sensed by a plurality of sensors that detect various states relating to a process being monitored, said monitoring system comprising:

input/output means coupled to a process controller that is coupled to a plurality of sensors for monitoring the states of such sensors;

logging means for periodically reading the states of various sensors and storing information relating to each such sensor state in a database storage means both as direct sensor readings and as derived sensor information calculated from readings of the sensor states of certain of the sensors;

database storage means for storing information received from said logging means relating to the reading of each sensor state;

display generating means for generating information to be displayed from the database storage means on said display means; and control means for controlling the operation of said logging means for selecting which of the sensors should be read, determining when such selected sensor should be read and deciding whether the readings from each selected sensor should be stored as a direct value or used for calculating a derived value that should be stored in said database storage means.

24. A data processing monitoring system including a digital computer having input/output means, memory and logic means and a display screen for recording and maintaining records of operation conditions sensed by a plurality of sensors that detect various states relating to a process being monitored, said monitoring system comprising:

input/output means coupled to a process controller that is coupled to a plurality of sensors for monitoring the states of such sensors;

logging means for periodically reading the states of various sensors;

control means for controlling operation of said logging means for selecting which of the sensors should be read, determining when each said selected sensor should be read and deciding whether the readings from each selected sensor should be stored as a direct value or used for calculating a derived value that should be stored in said database storage means;

database storage means for storing information received from said logging means relating to the reading of each sensor state;

graphic display means including graphic construction means for constructing a graphic display having a plurality of shapes with particular shapes being associated with particular sensors for varying the display of such shapes in dependence upon the readings obtained from such sensors.

25. A system according to claim 24 wherein said graphic display means includes historical playback means for enabling previously stored information stored in said database means from readings obtained by said logging means to be retrieved from said database means for playback through a selected graphic display.

26. A data processing monitoring system including a digital computer having input/output means, memory and logic means and a display screen for recording and maintaining records of operation conditions sensed by a plurality of sensors that detect various states relating to a process being monitored, said monitoring system comprising:

input/output means coupled to a process controller that is coupled to a plurality of sensors for monitoring the states of such sensors;

logging means for periodically reading the states of various sensors;

logging model construction means for constructing a plurality of different logging models with each logging model containing a list of particular sensors to be read and inforamtion regarding when a particular logging model should be invoked during operation of the process being monitored; and control means operating said logging means through a plurality of logging models by selecting a logging model to call into operation and logging data through said logging means based upon the selected logging model.

27. A system according to claim 26 wherein said control means further includes command set means for sending command setting signals to various process controllers controlling the process being monitored thereby varying operation of such process when certain logging models are called into operation.

28. A data processing monitoring system including a digital computer having input/output means, memory and logic means and a display screen for recording and maintaining records of operation conditions sensed by a plurality of sensors that detect various states relating to a process being monitored, said monitoring system comprising:

input/output means coupled to a process controller that is coupled to a plurality of sensors for monitoring the states of such sensors;

logging means for periodically reading the states of various sensors;

logging model construction means for constructing one or more logging models for determining which particular sensors are to be read by said logging means and a time and condition under which each of such sensors should be read;

database storage means for storing information read by said logging means; and graphic display means for generating information from the database storage means to be displayed on the display screen.

29. A data processing monitoring system including a digital computer having input/output means, memory and logic means and a display screen for recording and maintaining records of operation conditions sensed by a plurality of sensors that detect various states relating to a process being monitored, said monitoring system comprising:

input/output means coupled to a process controller that is coupled to a plurality of sensors for monitoring the states of such sensors;

logging means for periodically reading the states of various sensors;

logging model construction means for constructing one or more logging models for determining the particular sensors to be read by said logging means and a time and condition under which each of such sensors should be read;

database storage means for storing information received from said logging means relating to the state of the sensors read by said logging means; and control means for selecting a particular logging model to bring into operation for controlling operation of said logging means.

30. A system according to claim 29 wherein said logging model construction means enables a logging model to be constructed so that information obtained from each of the various sensors being monitored can be stored in any one of the following forms as analog information, digital information, derived analog information and derived digital information.

* * * * *

UNITED STATES PATENT AND TRADEMARK OFFICE
CERTIFICATE OF CORRECTION

PATENT NO. : 4,718,025

DATED : January 5, 1988

INVENTOR(S) : Paul S. Minor, Charles S. Matheny

It is certified that error appears in the above-identified patent and that said Letters Patent is hereby corrected as shown below:

```
Column 3, line 32, replace "are" with -- or --.
Column 4, line 2, change "value" to -- values --.
Column 4, line 18, change "tim" to -- time --.
Column 6, line 19, change "in stored" to -- is stored --.
Column 7, line 26, change "predicted" to -- predicated --.
Column 9, line 49, change "reverse" to -- reverse polish --.
Column 11, line 5, change "If the answer it 'yes', if then" to -- If the answer is 'yes' it then --; and line 10, change "data" to -- date --.

Column 14, line 21, change "all" to -- call --.
Column 17, line 19, change "selected sensor" to -- selected sensor read --; and on line 37, delete "said selector".
Column 18, line 8, change "a logging" to -- a particular logging --.
```

Signed and Sealed this

Twenty-fourth Day of January, 1989

Attest:

DONALD J. QUIGG

Attesting Officer

Commissioner of Patents and Trademarks